Patented Jan. 11, 1944

2,338,967

UNITED STATES PATENT OFFICE 2,338,967

ESTERS OF ALPHA CHLOROACRYLIC ACID

Maxwell A. Pollack, Austin, Tex., assignor to Pittsburgh Plate Glass Company, Pittsburgh, Pa., a corporation of Pennsylvania No Drawing. Application October 29, 1941, Serial No. 417,017

16 Claims. (Cl. 260—83)

This invention relates to esters of polyhydric compounds and alpha chloroacrylic acid, and its derivatives and polymers thereof.

In accordance with my invention, I have prepared esters of alpha chloroacrylic acid and various polyhydroxy compounds. These esters polymerize readily to form products having very advantageous properties. Esters of various polyhydroxy compounds such as ethylene, propylene, butylene, amylene, trimethylene, pentamethylene, decamethylene or other glycol or the corresponding polyglycols such as di-, tri-, or tetraethylene or propylene glycol, glycerol, alpha and beta alkyl glycerols such as alpha methyl glycerol, erythritol, pentaerythritol, sorbitol, mannitol, pinacol; halohydrins, such as glycerol mono chlorohydrin, the aryl polyhydroxy compounds such as pyrogallol, resorcinol, saligenin, phthalyl alcohol or other polyhydroxy benzene, anthracene or naphthalene compounds, dioxane diols, or the higher molecular weight hydroxy compounds such as cellulose, cellulose mono or diesters or ethers such as methyl, ethyl, allyl or crotyl cellulose or cellulose mono or diacetate, butyrate, crotonate, or acrylate, starch, glucose, or other sugar, or polyvinyl, polyallyl, or other polymerized unsaturated alcohol may be prepared. Either mono or polyesters thereof may be produced as desired. These esters may be polymerized to form insoluble infusible polymer, insoluble fusible, or soluble fusible polymers.

The esters may be prepared in suitable manner, as for example, by esterification of α-chloroacrylic acid which in turn may be prepared by a convenient process. I have found that α-chloroacrylic acid and its esters may be prepared in good yield by dehydrochlorinating αα- or αβ-dichloropropionic acid and esterifying the resulting acid or by the dehydrochlorination of the esters of such acids.

In the preparation of the esters from the acid, the acid may be esterified in a suitable manner, as by heating in the presence of the desired alcohol, and an esterification catalyst such as phosphoric acid, sulphuric acid, sulphonic acids, such as toluene-sulphonic acid and the like.

If desired, the α-chloroacrylic esters may be prepared directly by dehydrochlorination of the corresponding αβ- or αα-dichloropropionic ester as described in my United States Letters Patent No. 2,245,547. In this case, it is preferable to avoid the presence of an excess of the alkali hydroxide which would tend to saponify the esters and thereby to reduce the yield. This may be done by slowly adding the alcoholic solution of the alkali to the dichloro esters, preferably in alcoholic solution, using concentrations not substantially in excess of the amount theoretically required. After filtering to remove the precipitated salt as previously described, the ester may be purified by suitable means.

The ester may be obtained by fractional distillation of the esterification mixture. Because of the great tendency of these esters to polymerize, it is preferred to carry out this distillation under sub-atmospheric pressures suitably at a pressure below 300 mm. of mercury and in the presence of a polymerization inhibitor, such as hydroquinone, pyrogallol, aniline, copper chloride, sulphur, resorcinol, etc.

In view of the comparatively high boiling point of these esters and because of their tendency to polymerization, purification by distillation is often omitted. In such a case the reaction mixture may be washed one or more times with water or an aqueous salt solution and the washed ester dried with a suitable dehydrating agent such as calcium chloride, sodium sulphate, etc.

The α-chloroacrylic compounds may also be prepared by other suitable methods such as by dehydrohalogenation of the corresponding dichloropropionic compounds by vapor phase treatment, with or without the presence of catalysts, such as carbon black, powdered alumina, clays, etc.

The esters of polyhydroxy compounds and alpha chloroacrylic acid are usually mobile liquids but may in some cases be solids. The chloroacrylates polymerize rapidly to form polymers by use of heat and/or light, preferably in the presence of oxygen catalysts such as ozone, oxygen, benzoyl, hydrogen, acetyl and other peroxides, etc. In the case of the polyesters the material polymerizes rapidly to an infusible insoluble polymer unless precautions are taken to prevent the formation of such a polymer. On the other hand, the monoesters produce fusible polymers in their final stage of polymerization.

In view of the insolubility and infusibility of the polymers in their final state of polymerization, the polymers of the polyesters cannot be molded. Accordingly, when shaped products are desired, it is necessary to cast polymerize the product or to prepare a fusible intermediate polymer which may be molded to a desired form. Often it is difficult to cast polymerize these materials since considerable shrinkage occurs and the final products may be fractured to an objectionable degree unless polymerization is carried on slowly under carefully controlled conditions.

Upon heating the polyesters of chloroacrylic acid and polyhydroxy compounds to polymerize the same, it has been found that unless precautions are taken to avoid it, the product sets up into a gel at an early stage of the polymerization. In general, this gel is practically insoluble in organic solvents and may often be substantially infusible. It is a mixture containing a quantity of polymer and a large quantity of unpolymerized monomer. I have found that a fusible polymer may be obtained by interrupting polymerization before the polymer is converted to an insoluble or infusible gel. This product is soluble in a majority of solvents in which acrylate polymers are normally soluble and may be molded to a convenient form and rendered infusible by further polymerization in suitable manner, for example, by application of heat, light, or other sources of energy with or without catalyst. The fusible polymer may be prepared, for example, by polymerization of the esters in solvents which are capable of dissolving the fusible polymer, and interrupting polymerization before the infusible insoluble polymer is formed. Other methods whereby polymerization of one of the chloroacrylate radicals occurs without substantial interpolymerization of the other or others may also be resorted to.

In general, it has been found that the solvents, in which polymers of the saturated esters of the acrylates or alpha-substituted acrylate, such as methyl methacrylate, methyl chloracrylate, etc., are soluble, may be used for this purpose. Thus, such solvents as acetone, dioxane, chloroform, toluene, benzene, carbon tetrachloride, methyl cellosolve acetate, dibutyl phthalate, etc., are found to be suitable. In addition, the saturated acrylic or alpha-substituted acrylic esters such as monomeric methyl, ethyl, propyl, etc. methacrylate or chloroacrylate, or other polymerizable materials, for example, "vinylic" compounds, such as styrene, vinyl chloride, vinyl acetate, etc., may be added to the above solution before polymerization in order to form copolymers. Since such materials, particularly vinyl acetate, vinyl chloride, styrene, etc., dissolve substantial amounts of the fusible polymers, they may be used themselves as solvents.

In each case, the polymerization should be interrupted before the infusible product is produced. In accordance with one illustrative method of interrupting polymerization, the polymer may be separated from the solvent by convenient methods, for example, by the addition of a compound in which acrylate polymers are normally insoluble, such as methyl or ethyl alcohol, petroleum ether, water, ethylene glycol, etc., or by removal of all or a portion of monomer by distillation or by solvent extraction. This process permits the isolation of the fusible polymer of the alpha chloroacrylate ester in a substantially pure state.

Polymerization may also be halted by lowering the temperature of the reaction mixture to a suitable degree, for example, to room temperature or below. It has been found that although polymerization proceeds fairly rapidly at temperatures of 35–40° C., or above, the reaction rate increasing with increase of temperature, it proceeds at such a slow rate that it may be practically discontinued at lower temperature. This especially true when polymerization is carried out in solution.

In accordance with another effective method of interrupting polymerization, inhibitors, such as pyrogallol, hydroquinone, aniline, phenylene diamine, sulphur, thiophenol, organic or inorganic salts or complexes of the reduced forms of metals such as copper, manganese, cobalt, nickel, etc. may be added to the polymer during polymerization or before polymerization has been initiated. In this manner, solutions of the fusible polymer may be secured. These solutions may be treated to remove the solvent by slow evaporation, treatment with a nonsolvent, or other suitable method and fusible thermoplastic polymers which may be molded or otherwise worked into desirable forms are thereby obtained. After final shaping, the products may be completely hardened and rendered infusible by suitable methods hereinafter more fully set forth.

It has been found that the yield of fusible polymer appears to be dependent to a great extent upon the concentration of the monomer in the solution undergoing polymerization. Thus, when very concentrated solutions containing a large quantity, for example, in excess of 40–50 percent, of the monomeric glycol dichloroacrylate, are subjected to conditions of polymerization, the amount of fusible polymer which may be secured prior to gel formation is very low, often not in excess of 5 percent by weight of the theoretical yield. Conversely, when solutions containing somewhat lower concentrations of monomer, for example, up to 30 percent by weight, higher yields of the fusible polymer may be secured. Accordingly, it is preferred to deal with solutions having a monomer concentration below about 40 percent by weight.

In accordance with a further modification, however, concentrated solutions or undiluted monomer may be polymerized in the presence of a polymerization inhibitor in order to improve the yield which is obtainable.

In any case it is generally found desirable to separate at least a portion of the monomer from the fusible polymer whether the polymer be prepared from diluted or undiluted monomer. Often it is desirable to substantially completely remove monomer. However, the presence of some monomer often insures greater clarity for the final product and accordingly some monomer may be retained for certain purposes. In any event, however, it is desirable to remove sufficient monomer to produce a composition containing at least 35 and preferably in excess of 50 percent by weight of fusible polymer. Monomer polymer compositions may be prepared by various methods such as by distillation of monomer in the presence of an inhibitor, extraction of a semisolid partial polymer with a solvent for monomer which is not a solvent for polymer, precipitation with a mixture of solvent and nonsolvent, etc., or by addition of monomer to previously isolated fusible polymer.

The fusible polymers so produced have many characteristics which are similar to those of the polymers formed from the saturated acrylic acid esters. They are soluble in such organic solvents as acetone, dioxane, chloroform, ethyl cellosolve acetate, triacetin, phenyl cellosolve, etc., and soften upon heating. The exact softening points of the products are dependent to a great degree upon the temperature, catalyst concentration and monomer concentration of the solution undergoing polymerization. In general, it is found that the chloroacrylic esters soften at a temperature somewhat higher than the corresponding acrylic and methacrylic esters and at normal temperatures are somewhat harder and more dense. All of these products appear to be easily molded into convenient shapes.

In accordance with my invention, I have found that upon subjection of these polymers to heating at temperatures somewhat above the softening point thereof, for a sufficient period of time, they are converted into infusible, insoluble, generally transparent, hard and wear-resistant products. This conversion appears to occur in the absence of catalysts. It may be assisted, however, but the incorporation of usual polymerization catalysts, such as oxygen, ozone, air, peroxides, such as hydrogen peroxide, basic or acidic catalysts, light, etc. By use of catalysts, it is found that the conversion of these products to the infusible state may be secured at lower temperatures. The application of superatmospheric pressure has been found to assist the transformation to the insoluble and infusible stage and the production of clear products.

The properties of the products so produced are dependent to a degree upon the conditions under which they were rendered infusible. Thus, extremely hard, somewhat brittle products may be prepared by effecting the treatment at relatively high temperatures or under high pressures. On the other hand, somewhat stronger, less brittle materials may be secured when the treatment is carried under moderate pressures and temperatures sufficiently low to permit a slow conversion of the fusible polymer into its infusible stage through a period in which it is substantially completely molten.

By operation in accordance with the present invention, it is thus possible to form a molded article from the fusible polymer such as the fusible polymeric glycol or glycerol chloroacrylate previously referred to, and thereafter to render the molded product insoluble and infusible by heat. In this manner, I am able to prepare the transparent, hard, infusible molded products which have many of the desirable properties of the conventionally known thermoplastic resins. By proper regulation of the pressure and temperature, the fusible polymer may be extruded under such conditions that it becomes infusible as it leaves the extrusion dies.

A large number of inert substances may be incorporated with the fusible polymer before subjecting to molding conditions. Suitable for such purposes are: fillers, such as wood-flour, mica, cotton flock, etc.; plasticizers, such as dibutyl phthalate, dicyclohexyl phthalate, triacetin, tricresyl phosphate, natural and synthetic resins, pigments, including titanium dioxide, carbon black, chromic oxide, lead chromate, etc., and organic dyestuffs, such as methylene blue, methyl orange, etc.

The polymers which I have prepared are capable of numerous uses, such as in lacquers, or other coating compositions, molded articles, safety glass, etc. Where the composition is used for coating, it may be applied in solution or in solid form, either alone or in combination with natural or synthetic drying oils or resins and the like, the solvent removed and the coated article baked to render the surface infusible. In this manner, it is possible to surface other polymers which are less resistant to the action of solvents or of heat. When a coating of the fusible polymer of glycol dichloroacrylate is deposited upon polymerized methyl methacrylate or similar polymer and the solvent removed, a coherent surface thereof is formed. Upon heating the coated article to suitable temperatures, this surface may be made transparent, hard and infusible.

Coatings may also be applied to metal, glass, wood, synthetic resins, etc., surfaces by extrusion of the heated fusible polymer directly on the suitably-prepared surface. In similar manner, the surface may be heated and the polymer applied in powdered form, whereupon fusion occurs first to give a smooth, homogeneous film which may be heat-hardened.

These resins are also suitable for many uses in the field of laminated products. For example, products of great strength, elasticity and adherence may be secured by converting fusible ethylene glycol, dichloracrylate, etc., into the infusible state in the presence of a substantial amount of a compatible softening agent. Satisfactory non-shatterable glass sheets may be obtained by heating a combination of superposed sheets where the thermoplastic glycol chloracrylate polymer and a softening agent such as dibutyl phthalate are used as the adhesive layer.

It has been found that these products are applicable for impregnation purposes. Thus, leather, paper, wood or other comparatively porous substances may be steeped in a solution of the fusible polymer of glycol chloracrylate, for example, and then heated alone, under pressure, or in the presence of catalysts to convert the absorbed polymer to the insoluble, infusible form. Greatly improved products, particularly in regard to strength, water-proofing, and electrical properties are obtained.

These polymers are compatible with a large number of materials which may be incorporated therein. Products with a wide range of properties may be obtained by incorporating modifying agents either before, during, or after polymerization. For example, fillers, such as carbon black, wood flour, asbestos, china clay, etc. may be thus added to give opaque products. In a similar fashion, transparent or translucent materials may be obtained by incorporating substances which are soluble in the polymers such as plasticizing or softening agents, for example, phthalic esters, such as the methyl, ethyl, butyl, cyclohexyl, benzyl, or lauryl, phthalates; similar esters of other dibasic acids such as succinic, fumaric, maleic, diphenic, adipic, and tartaric acids; camphor; esters of polyhydric alcohols, such as glycol distearate, glycol dihexoate, triacetin, tributyrin, or glycol benzoate; ethers, esters, mixed ether-esters, or mixed ether-alcohols, such as anisole, hydroxyethyl ether, tetra-ethylene glycol monostearate, etc.; hydrocarbons, such as tetra-phenyl ethane, dixylyl ethane, diphenyl and terphenyl, halogenated hydrocarbons such as chlorinated diphenyl, chlorinated naphthalene, and the like; nondrying or semi-drying oils, such as castor oil, etc.; inorganic esters, such as tributyl phosphate, triphenyl phosphate, and amides, such as p-toluenesulfonamide, tetraethyl phthalamide, and succinamide.

A great variety of color effects may be obtained by incorporating soluble or insoluble coloring matters therein. A large number of such materials lend themselves to application because of the inertness and neutrality of the resins themselves.

In accordance with a further modification of my invention, I may form conjoint polymers of a chloroacrylic ester or other derivative of chloroacrylic acid with other polymerizable materials, such as α-chloroacrylic acid, esters, chlorides, amides, anhydrides, or nitriles of acrylic or methacrylic acid, vinyl chloride, vinyl acetate or other esters of vinyl alcohol, styrene, butadiene, β-chlorobutadiene, isoprene, polyhydric alcohol, polybasic acid reaction products such as glycerol phthalate, phenol-urea, or amine-aldehyde condensation products and the like. By treating a mixture of a chloroacrylic acid derivative and one or more of these materials to secure polymerization, a product may be obtained having improved properties but which retains certain characteristics of the pure polymer. Thus, for example, by copolymerizing a mixture of glycol di-α-chloroacrylate and methyl methacrylate, a tough, colorless, hard, substantially infusible and insoluble and wear-resistant resin is secured.

Example I

The mono α-β-dichloropropionate of ethylene glycol was prepared by refluxing one mole of α,β-dichloropropionic acid with one and one-half moles of ethylene glycol in the presence of one-half percent of p-toluenesulfonic acid. The water of reaction was removed continuously by distillation with carbon tetrachloride using an automatic separator.

After the water had been removed, the carbon tetrachloride was distilled, leaving the glycol mono α,β-dichloropropionate in mixture with the excess glycol and some diester.

To this mixture was then added slowly an equivalent quantity of sodium carbonate containing some bicarbonate. The mixture was heated and stirred well to complete the reaction, and the mono-chloroacrylic ester of ethylene glycol thus obtained was rectified by distillation, and the fraction boiling from 105° C. to 115° C. under a pressure of 5 mm. of mercury which was collected, was found to be substantially pure glycol monoalphachloracrylate.

Example II

The di-α-chloroacrylic ester of ethylene glycol was made by dispersing one mole of glycol, 2.5 moles of α-chloroacrylic acid, one percent of p-toluenesulfonic acid and 0.50% of hydroquinone in carbon tetrachloride, and heating the mixture. Water and carbon tetrachloride was distilled and the vapor condensed, the carbon tetrachloride being returned to the system and the water being discarded. At the end of the reaction, the reaction mixture was cooled and washed with dilute aqueous sodium bicarbonate and distilled. The ester was obtained as a liquid boiling between 105° C. and 115° C. under a pressure of 1.5 mm. of mercury.

Example III

The tri-α-chloroacrylic ester of glycerol was made by a process analogous to that of Example II, employing one mole of glycerol, 4.5 moles of the acid, two percent of p-toluenesulfonic acid, and one-half percent of hydroquinone. After all the water was removed, the ester was washed with dilute aqueous sodium bicarbonate and dried over anhydrous sodium sulfate. The purified product was a colorless high boiling liquid which polymerized when distillation was attempted.

Example IV

Ethylene glycol mono-α-chloroacrylate was polymerized by heating at 70° C. with one-half percent of benzoyl peroxide. The product was a hard solid which was fusible and soluble in dioxane.

Example V

Polymerization of ethylene glycol di-α-chloroacrylate under the conditions of Example IV gave a hard, brittle mass which was infusible and insoluble in dioxane.

Example VI

A 15% dioxane solution containing a trace of hydroquinone in addition to one percent benzoyl peroxide was heated to polymerize the mixture and polymerization was interrupted by cooling the mixture. After a noticeable change in the viscosity of the monomer, a dioxane-soluble solid was obtained by pouring the mixture into methanol. This product dried to a white powder which, upon heating under pressure of 200 pounds per sq. in. converted to a hard, clear sheet.

Example VII

A soluble fusible polymer of glycerol tri-α-chloroacrylate was also obtained by controlled polymerization, according to the procedure of Example V. The polymer was a white powder which fused and converted under heat and pressure to form a hard, clear infusible sheet.

Although the present invention has been described in connection with the specific details of certain embodiments thereof, it is not intended that such details shall be regarded as limitations upon the scope of the invention, except insofar as included in the accompanying claims. The present application is a continuation-in-part of my copending application Serial No. 181,721, filed December 24, 1937.

I claim:

1. Ethylene glycol mono alpha chloroacrylate.
2. Eethylene glycol di alpha chloroacrylate.
3. Glycerol poly alpha chloroacrylate.
4. An ester of a polyhydroxy alcohol and alpha chloroacrylic acid.
5. A polymer of ethylene glycol mono alpha chloroacrylate.
6. A polymer of ethylene glycol di alpha chloroacrylate.
7. A polymer of glycerol poly alpha chloroacrylate.
8. A polymer of an ester of a polyhydroxy alcohol and alpha chloroacrylic acid.
9. A polyester of a polyhydric alcohol and alpha chloroacrylic acid.
10. A method of preparing a fusible polymer which comprises heating a polyester of a polyhydric alcohol and alpha chloroacrylic acid to polymerize the same, interrupting polymerization after substantial polymerization has occurred but before the polymer is converted into an infusible gel, separating at least a portion of unpolymerized ester and continuing polymerization of the polymer.
11. The process of claim 10 wherein the ester is an ester of a polyhydric alcohol.
12. The process of claim 10 wherein the ester is glycerol poly alpha chloroacrylate.
13. The process of claim 10 wherein the ester is a glycol ester.
14. A fusible heat-convertible polymer of a polyester of a polyhydric alcohol and alpha choroacrylic acid.
15. A fusible heat-convertible polymer of ethylene glycol di alpha chloroacrylate.
16. A fusible heat-convertible polymer of glycerol poly alpha chloroacrylate.

MAXWELL A. POLLACK.